United States Patent [19]

Sheu

[11] 4,303,180
[45] Dec. 1, 1981

[54] VACUUM INSULATED, HEAT RETAINING, LIQUID DISPENSING BOTTLE

[76] Inventor: Jin Y. Sheu, No. 795, Dong Dah Rd., Shin Jwu City, Taiwan

[21] Appl. No.: 54,082

[22] Filed: Jul. 2, 1979

[51] Int. Cl.³ .............................................. B67D 5/54
[52] U.S. Cl. .................................... 222/204; 222/401
[58] Field of Search ............... 222/131, 380, 384, 416, 222/183, 385, 209, 401, 204; 215/13 R, 13 A, 420–422; 137/133, 145

[56] References Cited

U.S. PATENT DOCUMENTS

| | | | |
|---|---|---|---|
| 466,336 | 1/1892 | Franklin | 222/204 |
| 3,160,330 | 12/1964 | Pollitt | 222/209 |
| 3,905,520 | 9/1975 | Nishioka | 222/209 |

*Primary Examiner*—Stanley H. Tollberg
*Attorney, Agent, or Firm*—Karl W. Flocks

[57] ABSTRACT

A vacuum insulated, heat retaining, liquid dispensing bottle which can readily dispense or supply water comprises an outer bottle body, a bottle cover, an internal bottle installed within and spaced from the outer bottle body providing the function of precluding heat loss, a siphon pipe extending deeply into the internal bottle, a discharge pipe with an end connected to the siphon pipe and a lower end extending out of the outer bottle body. The lower end of the discharge pipe is equipped with a discharge valve. The bottle is further equipped with a stopper having a compressed air mechanism. After liquid stored within the internal bottle fills the siphon pipe and the discharge pipe, liquid may be dispensed or not dispensed from the bottle by switching on or switching off the discharge valve provided outside of the bottle body.

3 Claims, 3 Drawing Figures

VACUUM INSULATED, HEAT RETAINING, LIQUID DISPENSING BOTTLE

BACKGROUND OF THE INVENTION

The present invention relates to a vacuum insulated, heat retaining, liquid dispensing bottle which can readily dispense or supply water and, more particularly, to a bottle of simple and novel construction which may immediately and quickly supply water.

Heretofore, many types of vacuum insulated bottles have been proposed for practical use, such as the oldest type of vacuum insulated bottle operated by hand and the most popular type in market including the compressed air insulated bottle and the electric, vacuum insulated bottle.

The above mentioned vacuum bottle operated by hand has become obsolete due to its inconvenience of operation, particularly to elderly people and young children. As for the electric, vacuum insulated bottle, it is not available universally, because of its complicated construction, higher cost, and propensity of becoming out of order. In the case of the compressed air vacuum insulated bottle, the most popular type currently, requires that the compressed air device be continuously pressed by hand when it is in use for dispensing water. Not only is the operation rather inconvenient but also the air bladder within compressed air device is easily cracked in overlapping position under more and more pressings and finally loses its ability to compress air. Further, according to the compressed air, vacuum insulated bottle, it is difficult to control the amount of water discharged because there is no definite air being compressed in each pressing, so that dispensing less than the desired amount of water into the cup less enough or too much water is a common phenomenon.

The primary object of the present invention is to overcome the drawbacks of the conventional vacuum insulated bottles and to disclose a vacuum insulated bottle which can readily supply water having novel and simple construction which surely has an improved effect.

SUMMARY OF THE INVENTION

In accordance with the present invention, the vacuum insulated bottle which can readily dispense or supply water is comprised of a vacuum insulating outer bottle body, a bottle cover, an internal bottle installed within the bottle body having the function of precluding heat loss, a siphon water pipe extending deeply into the internal bottle, a discharge pipe of which an upper end is connected to the siphon water pipe and a lower end extends out of the bottle body having a discharge valve, and a bottle stopper with a compressed air mechanism. After the internal bottle is filled with water, it is only necessary, by means of compressed air mechanism equipped in the bottle stopper, to compress air into the internal bottle adding pressure on the surface of water to force water (liquid) flowing to the lower end of the discharge pipe through the siphon water pipe and the discharge pipe. Therefore, at any time, when it is desirous to have water, one needs only to turn on the discharge valve provided on the lower end of the discharge pipe to discharge water and turn off the discharge valve after dispensing water.

Thus, the other object of the present invention is to provide a vacuum insulated bottle which can readily supply water, stored within the internal bottle which will quickly flow out upon turning on the discharge valve without the operation of compressing air or electricity.

Another object of the present invention is to provide a vacuum insulated bottle which can readily supply water stored within the internal bottle which will immediately stop flowing out upon turning off the discharge valve. In such a result, it may arbitrarily control the amount of water discharged so as to avoid the phenomena of dispensing less than enough or too much water.

DETAILED DESCRIPTION

Figure 1:
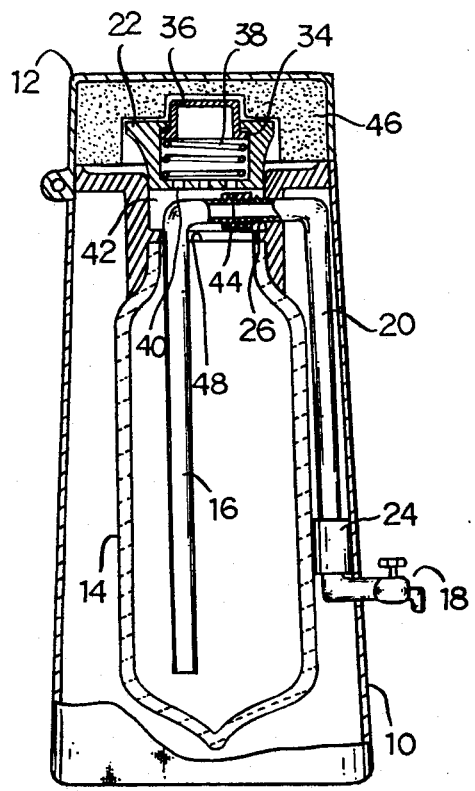
FIG. 1 is a longitudinally sectional view of a vacuum insulated bottle which can readily supply water according to the present invention.

A vacuum insulated bottle which can readily dispense or supply water is comprised of an outer bottle body 10, a bottle cover 12, an internal bottle 14 installed within the outer bottle body 10 and spaced therefrom to preclude heat loss, a siphon pipe 16 extending deeply into the internal bottle 14, a discharge pipe 20 with an upper end connected to the siphon pipe and a lower end extending out of the outer bottle body 10 having a discharge valve 18 which looks like a faucet, and a bottle stopper 22 with a compressed air mechanism.

The discharge pipe 20 is disposed substantially entirely inside the bottle body 10 or equipped between the bottle body 10 and internal bottle 14. The upper end of the discharge pipe 20 has been engraved with screw threads and is extended to over the opening 48 of bottle body 10, and the other end, the lower end, is anchored between the bottle body 10 and the internal bottle 14 by means of a fixture 24 and further extends out of the bottle body 10 in which has a discharge switch 18 like a faucet.

Figure 2:
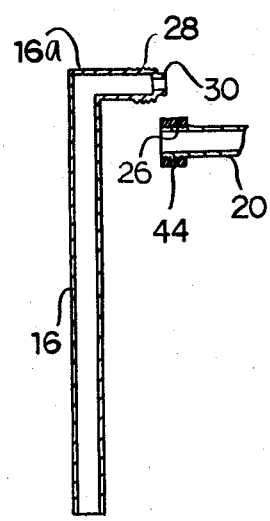
FIG. 2 a longitudinally sectional view of the siphon pipe and the discharge pipe which are seperated and taken in the plane in accordance with the present invention.

The bottom end of the siphon pipe 16 extends deeply into the inner side of the internal bottle 14, with an upper end 16a of the siphon pipe 16, having been engraved with screw threads 28 and a further projecting part 30, as appearing in FIG. 2, so that said projecting part 30 may combine and engage with an upper end of said discharge pipe 20 by means of a threaded connector 44 having screw threads in its inner wall. In such an arrangement siphon pipe 16 and the discharge pipe 10, will become a communicating pipe.

Figure 3:
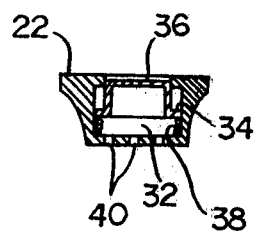
FIG. 3 is a longitudinally sectional view of the compressed air mechanism equipped within the bottle cover while compressing air into the internal bottle in accordance with the present invention.

Referring to FIG. 1 and FIG. 3, the bottle stopper 22 is designed to be a centrally spaced ring housing 32, having an opening on top side and air holes 40 on bottom side, in which the ring housing 32 is disposed within its inner side with a ring shaped member 34 which closely engages with the housing 32 and also extends upward as a pressing portion 36. Also, a coil compressed spring 38 is set on the bottom side of the ring shaped member 34 which is within the housing 32.

According to the present invention, after liquid is poured into the internal bottle 14 for storage without heat loss, the liquid within the internal bottle 14 will be easily absorbed into the discharge pipe 20 through the siphon pipe 16 because the calibers of both the siphon pipe 16 and the discharge pipe 20 are all small. Also, the opening 42 on the upper side of the internal bottle 14 is corked by a bottle stopper 22. Therefore, when liquid within the internal bottle 14 is less than a level which is the least degree of liquid able to be absorbed into the discharge pipe 20 through the siphon pipe 16, if necessary, the pressing portion 36 provided on the bottle stopper 22 may be pressed so as to force air within the housing 32 into the internal bottle 14 through the air hole adding pressure on the surface of liquid to have liquid absorbed into the discharge pipe 20 through the siphon pipe 16. However, due to the lower end of the discharge pipe 20 being in normally closed condition, the above described operation will fill the siphon pipe 16 and the discharge pipe 20. Therefore, when it is desirous to dispense water after the bottle is covered by the bottle cover 12, is only necessary to open the discharge valve 18 which is on the outside of the bottle without opening the bottle cover 12 or any other handed operations so water will readily and quickly flow out without tipping the bottle from an erect position. And when the discharge switch valve is switched off, water will also immediately stop flowing out. At this time, water still fills the siphon pipe 16 and the discharge pipe 20, thus water will be also immediately flowing out after opening or switching on the valve 18 even though the discharge valve 18 has been switched on and off for many times in continuity.

As shown in FIG. 2, the siphon pipe 16 may be arbitrarily separated from the discharge pipe 20 and taken out from the inner side of the internal bottle 14 so as to be convenient to users for cleaning the siphon pipe 16 and the internal bottle 14. On the other hand, it may pour clean water into the internal bottle 14, then to switch on the discharge valve 18 to drain water out of the internal bottle 14 through the siphon pipe 16 and the discharge pipe 20 by continuing pressing the pressing portion 36 of the bottle stopper 22 to add pressure on the surface of liquid which is within the internal bottle 14 so that it is easy to wash the internal bottle 14, the siphon pipe 16 and the discharge pipe 20. Furthermore, the inner side of the bottle cover 12 is filled with a kind of special insulation material having heat retention character in order to enhance the positive effect of precluding heat loss or transfer. Also, the compressed air mechanism provided within the bottle stopper 22 may be replaced by other compressed air devices.

I claim:

1. A vacuum insulated, heat retaining bottle which can readily supply water from an erect position comprises an outer bottle body, a bottle cover, an internal bottle installed within the bottle body and spaced therefrom to preclude heat loss therefrom, a siphon pipe extending deeply into the internal bottle, a discharge pipe extending substantially entirely inside the outer body with an upper end connected to the siphon pipe and a lower end extending out of the outer bottle body, said lower end having a discharge valve, and said bottle having a stopper with a compressed air mechanism so that after the internal bottle is filled with water to the extent that the siphon pipe and the discharge pipe are filled, the bottle is enabled to discharge or stop discharging water when the discharge valve provided outside of the bottle body is switched on or switched off, wherein the bottle stopper is designed to be a centrally spaced ring housing, having an opening on its top side and air holes on its bottom side, said ring housing being equipped within its inner side with a ring shaped member closely engaging with the housing and extending upward as a pressing portion and including a coil compressed spring set on the bottom side of the ring shaped member within the housing.

2. A vacuum insulated, heat retaining bottle which can readily supply water from an erect position comprises an outer bottle body, a bottle cover, an internal bottle installed within the bottle body and spaced therefrom to preclude heat loss therefrom, a siphon pipe extending deeply into the internal bottle, a discharge pipe extending substantially entirely inside the outer body with an upper end connected to the siphon pipe and a lower end extending out of the outer bottle body, said lower end having a discharge valve, and said bottle having a stopper with a compressed air mechanism so that after the internal bottle is filled with water to the extent that the siphon pipe and the discharge pipe are filled, the bottle is enabled to discharge or stop discharging water when the discharge valve provided outside of the bottle body is switched on or switched off, wherein the inner side of the bottle cover is filled with insulation material precluding heat loss.

3. A vacuum insulated, heat retaining bottle which can readily supply water from an erect position comprises an outer bottle body, a bottle cover, an internal bottle installed within the bottle body and spaced therefrom to preclude heat loss therefrom, a siphon pipe extending deeply into the internal bottle, a discharge pipe extending substantially entirely inside the outer body with an upper end connected to the siphon pipe and a lower end extending out the outer bottle body, said lower end having a discharge valve, and said bottle having a stopper with a compressed air mechanism, so that after the internal bottle is filled with water to the extent that the siphon pipe and the discharge pipe are filled, the bottle is enabled to discharge or stop discharging water when the discharge valve provided outside of the bottle body is switched on or switched off, wherein the discharge pipe is disposed between the outer bottle body and the internal bottle, and the water outlet provided on the lower end of the discharge pipe extends out of the outer bottle body.

* * * * *